Patented Aug. 31, 1948

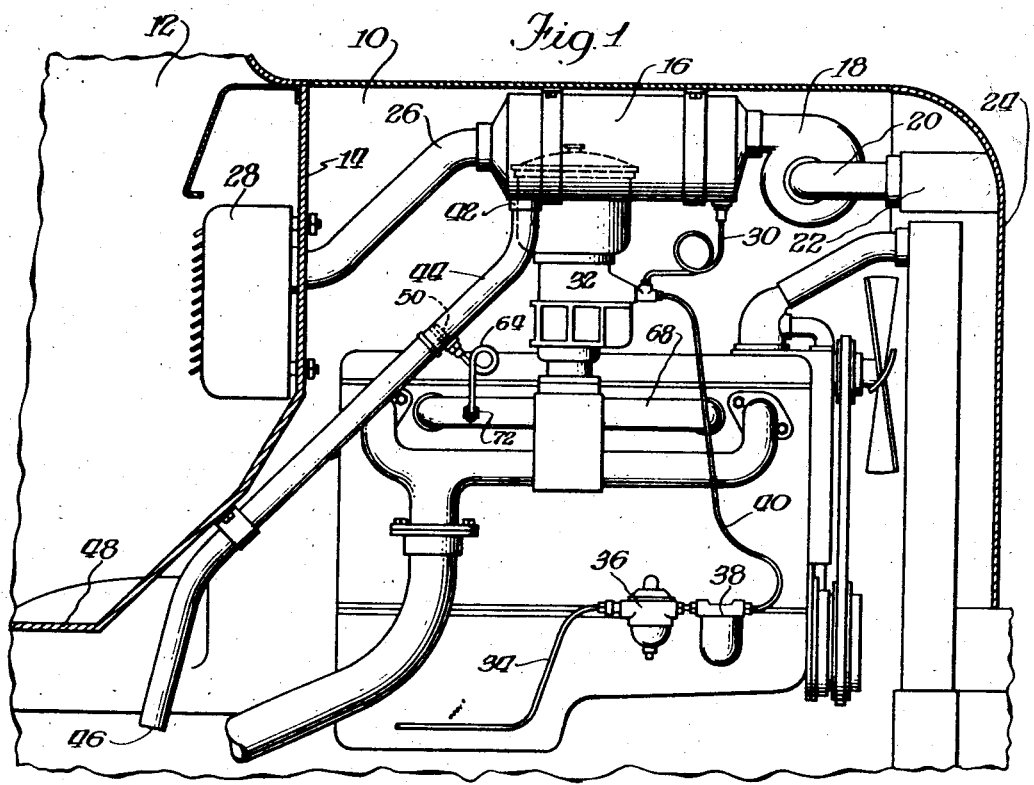

2,448,132

UNITED STATES PATENT OFFICE 2,448,132

HEATER EXHAUST SYSTEM

Lynn A. Williams, Jr., Indianapolis, Ind., assignor to Stewart-Warner Corporation, Chicago, Ill., a corporation of Virginia Application June 27, 1946, Serial No. 679,602

2 Claims. (Cl. 237—12.3)

1

The present invention relates to heater exhaust systems. More particularly it is concerned with an improved exhaust system for use with a combustion heater of a type suitable for heating the occupied space of an automobile or the like.

One of the objects of the present invention is to provide a novel exhaust system for use with a gasoline or other liquid fuel burning heater which conducts the heater exhaust to the atmosphere at a point outside the occupied space and also provides against possibility of unburned liquid fuel flowing from the end of the exhaust pipe in the event the heater fails to start.

Another object of the present invention is to provide a combustion heater installation for an automobile or the like and an exhaust system for the heater such that the exhaust from the heater is discharged to the atmosphere at any point outside the vehicle without the exhaust system constituting a possible fire hazard.

Still another object of the present invention is to provide an improved exhaust system for accomplishing the above at low cost.

Other objects and advantages will become apparent from the following description of a preferred embodiment of my invention which is illustrated in the accompanying drawings.

In the drawings, in which similar characters of reference refer to similar parts throughout the several views:

Fig. 1 is a vertical sectional view through an automobile engine compartment and the adjacent portion of the driver's compartment showing the automobile engine, the heating system, and other adjacent equipment;

Fig. 2 is a fractional sectional view of a portion of the heater exhaust system; while Fig. 3 is a sectional view of a fitting that may advantageously be used in conjunction with the exhaust system of the present invention.

In Fig. 1 of the drawings I have shown a portion of an automobile having an engine compartment 10 and a passenger-occupied portion 12. These two portions are separated by a dash 14. A combustion type heater 16 is located within the engine compartment at any convenient point and is supplied at one end with ventilating air by a blower 18 which is connected on its inlet side by way of a duct 20 to an inlet opening 22 disposed behind the engine radiator grill 24 or at some other convenient location. Hot air is piped from the heater by a duct 26 to one or more distributing openings 28 located within the driver's compartment.

The heater 16 per se forms no part of the

2 present invention and therefore needs no detailed description. Essentially, it comprises a burner, not shown, which is supplied with gasoline by way of a fuel line 30 leading from the inlet connection of the engine carburetor 32, the carburetor receiving fuel through a line 34 from the fuel tank, this line leading to an engine-driven fuel pump 36 and from the pump to a settling bowl 38 and thence by way of a fuel line 40 to the carburetor.

Within the heater 16 fuel received from the line 30 is burned in the presence of air and the hot products of combustion thus produced pass through a heat exchanger within the heater casing and thence to an exhaust fitting 42. An exhaust pipe 44 is connected to this fitting and leads to the atmosphere at a point 46 such that products of combustion cannot find access to the occupied portion of the vehicle. In Fig. 1, this exhaust point is shown as being located beneath the floor boards 48 of the vehicle. A heater of this general type is described and illustrated in greater detail in the copending application of William A. Marshall, Jr., Serial No. 615,040, filed September 7, 1945, for "Heating apparatus." Another heater of suitable type will be found in the copending application of George W. Allen and Vernon N. Tramontini, filed June 14, 1946, for Heaters, and which has been given Serial No. 676,776.

In such heaters, combustion is usually started by a hot wire igniter which may possibly fail in operation or for some other reason the heater may fail to start even though fuel has been turned on and is being supplied to the combustion chamber at the usual rate. Under these conditions, a portion of the fuel may be vaporized so that it passes from the end of the exhaust pipe 44 in the form of gasoline and air mixture. This mixture, however, is not combustible since it is too lean to burn. The gases passing from the exhaust pipe are therefore not dangerous and do not constitute a fire hazard.

Inasmuch as a portion of the liquid gasoline is not vaporized within the heater this fuel would normally drain down the inside of the exhaust pipe and drip from the end thereof, and under some conditions might constitute a fire hazard. In order to avoid this possible fire hazard I have provided an arrangement for removing all liquid gasoline from the exhaust pipe at an intermediate point and for disposing of this liquid portion in a safe manner.

The mechanism for accomplishing this includes a drawn or otherwise suitably formed sheet metal stepped ring 50 which is located within the exhaust pipe 44 in such manner that a large cylindrically flanged end 52 thereof forms a close fit with the interior of the exhaust pipe and may in fact be welded or otherwise permanently secured in place therein. A portion of this ring forms a radially inwardly projecting annulus 54 and a second cylindrical flange 56 formed at the smaller diameter thereof so arranged that the flange 56 is generally coaxial with the flange 52 but is of somewhat smaller diameter. The ring 50 is so disposed within the exhaust pipe that the flange 56 is located upstream of the flange 50, thereby providing an annular pocket 58 between the flange 56 and the inner surface of the exhaust pipe which forms a trap to catch any liquid gasoline flowing along the side wall of the exhaust pipe. Gases flowing through the pipe pass through the opening in the center of the ring 52 and continue on to the remotely located outlet.

In order to remove collected liquid fuel from the pocket 58, a fitting 60 is secured to the exhaust pipe at a point opposite the trap and a passage 62 extends from the fitting 60 through the side wall of the exhaust pipe such that the inner end of this passage opens within the pocket 58 closely adjacent the upstream edge of the annular ring 54. A small diameter tube 64 is connected to a fitting 60 at one end, its opposite end being connected to a fitting 66 threaded into the intake manifold 68 of the automobile engine.

Because of the low pressure prevailing within the intake manifold 68 there will be a continuous flow through the pipe 64 from the inlet end of the passage 62 to the manifold 68. The rate of flow of air or gases through this passage is so slight, however, that it will have no disturbing influence upon the operation of the automobile. On the other hand, if gasoline in liquid form should flow down the side wall of the pipe 44 it will be caught in the annular pocket 58 and will be carried along the stream of gases flowing through the pipe 64 so that it passes into the intake manifold and thence to the engine cylinders where it is harmlessly consumed.

Although I have shown the ring 50 within the exhaust pipe 44 as forming the trap for the purpose of catching liquid gasoline and transferring this liquid to the tube 64 leading to the intake manifold, it will be appreciated that a liquid trap of any other suitable type may be used, the specific ring shown being merely illustrative of one convenient and inexpensive expedient for forming such a trap.

The fitting 66 in Fig. 3 is shown as including a portion 70 which forms a Venturi shaped passage 62 through which the gases flow on their way to the intake manifold. This fitting, although not necessary in many installations, is none the less an advantage in that it tends to maintain the rate of flow through the tube 64 substantially constant regardless of the degree of vacuum within the intake manifold 68. This is probably because a slight pressure reduction within the manifold 68 is sufficient to cause gases to flow through the venturi at or approaching the speed of sound in the medium at the low pressure prevailing at the throat. Once these conditions have been reached any further drop in pressure within the manifold 68 will not cause a substantial increase in the rate of flow through the Venturi throat.

From the above description of a preferred embodiment of my invention it will be seen that I have provided a simple and efficient arrangement for preventing liquid gasoline from flowing out of the heater exhaust pipe to a place where it might produce a fire hazard. It will be appreciated also that this liquid gasoline has safely been removed to the intake manifold of the engine without the necessity for dumping any appreciable quantity of exhaust gases or air into the manifold. Thus, a heater used with the present system may have much greater heat output capacities than is possible if all of the heater exhaust is carried to the engine manifold.

Having described my invention, what I claim as new and useful and desire to secure by Letters Patent of the United States is:

1. A heating system for an automotive vehicle having an internal combustion engine including an intake manifold comprising: a liquid fuel burning heater, means for supplying liquid fuel to said heater for combustion therein, an exhaust pipe connected to said heater for removing products of combustion therefrom, said exhaust pipe emptying to the atmosphere, means forming a liquid trap in said exhaust pipe, conduit means connected between said trap and the intake manifold, and restricting means in said conduit for limiting the rate of flow therethrough to a small proportion of the rate of flow of exhaust gases through said exhaust pipe.

2. A heating system for an automotive vehicle having an internal combustion engine including an intake manifold comprising: a liquid fuel burning heater, means for supplying liquid fuel to said heater for combustion therein, an exhaust pipe connected to said heater for removing products of combustion therefrom, said exhaust pipe emptying to the atmosphere, means forming a liquid trap in said exhaust pipe, conduit means connected between said trap and the intake manifold, and means forming a flow restricting venturi inside said conduit.

LYNN A. WILLIAMS, JR.

REFERENCES CITED

The following references are of record in the file of this patent:

UNITED STATES PATENTS

| Number | Name | Date |
|---|---|---|
| 2,213,656 | Pinkerton et al. | Sept. 3, 1940 |
| 2,226,612 | McCollum | Dec. 31, 1940 |
| 2,400,509 | Heymann | May 21, 1946 |